United States Patent Office 3,495,679
Patented Feb. 17, 1970

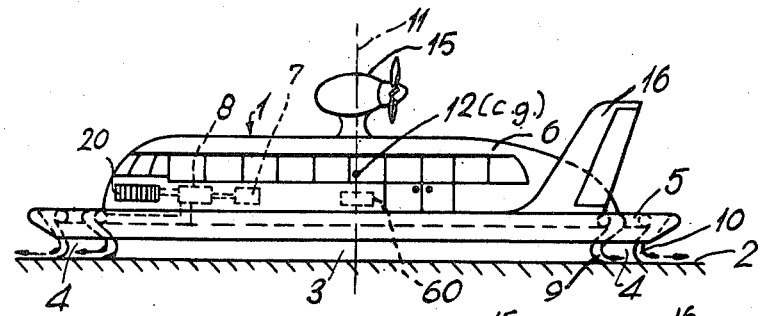
FIG.1.
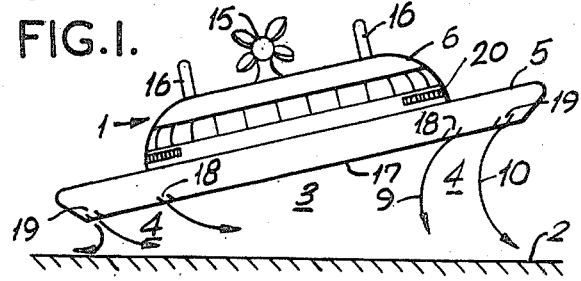
FIG.2.
FIG.3.
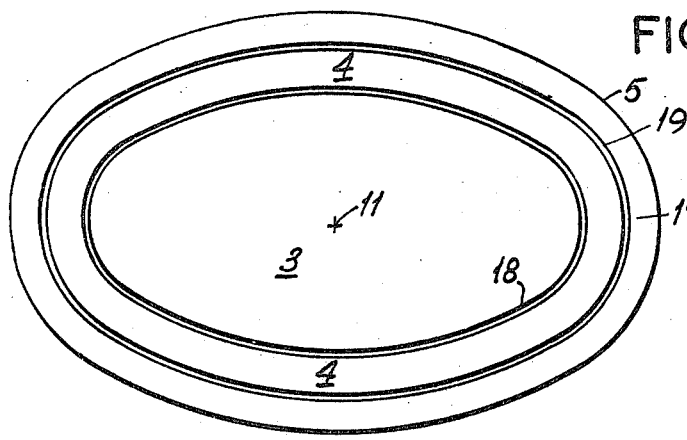
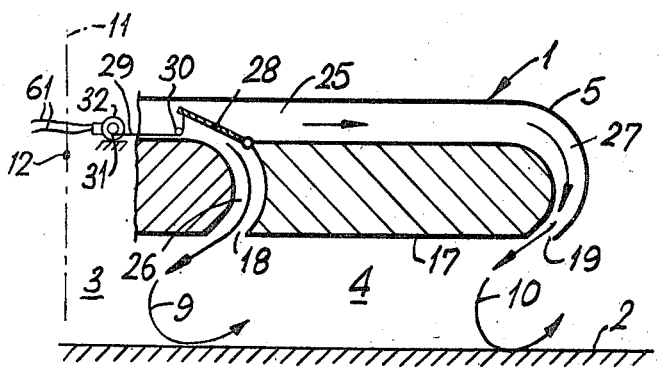
FIG.4.
INVENTOR
C. S. COCKERELL
BY Cameron, Kerkam & Sutton
ATTORNEYS

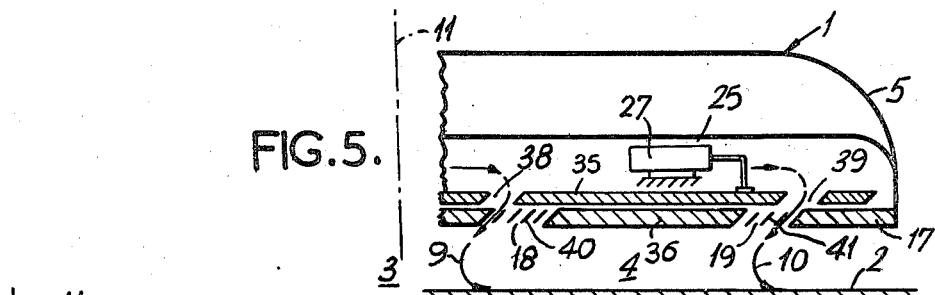
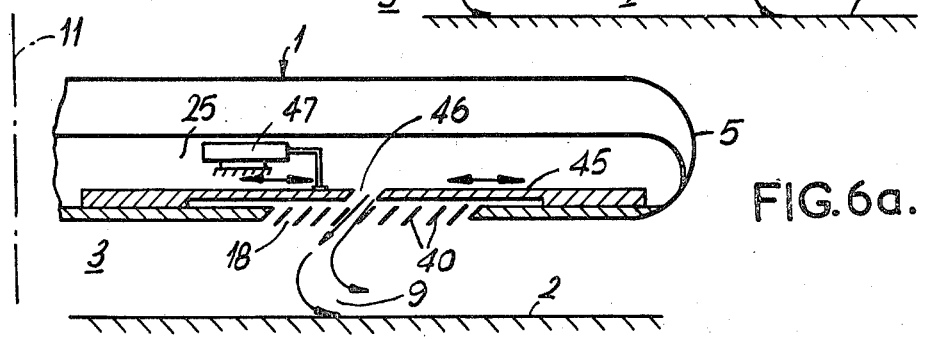
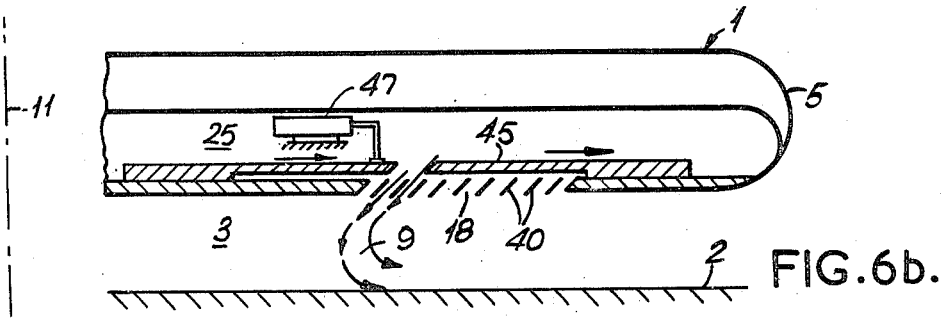

3,495,679
VEHICLE FOR TRAVELLING OVER LAND AND/OR WATER
Christopher Sydney Cockerell, Bassett, Southampton, England, assignor to Hovercraft Development Limited, London, England, a British company
Continuation-in-part of application Ser. No. 16,677, Mar. 22, 1960, now Patent No. 3,412,956. This application July 26, 1967, Ser. No. 656,264
Claims priority, application Great Britain, Mar. 23, 1959, 9,900/59
Int. Cl. B60v 1/00, 1/02
U.S. Cl. 180—118                                                                8 Claims

ABSTRACT OF THE DISCLOSURE

In a gas cushion vehicle any tendency for the vehicle to roll or pitch can be reduced by laterally displacing at least part of the means containing the vehicle supporting cushion and thereby varying the position of the cushion centre of pressure relative to the centre of gravity of the vehicle. Where the vehicle-supporting cushion is contained by a fluid curtain, roll and pitch control can be achieved by sideways movement of the port structure from which curtain-forming fluid issues.

---

This application is a continuation-in-part of application Ser. No. 16,677 filed Mar. 22, 1960, now Patent No. 3,412,956, and relates to gas-cushion vehicles, that is to say, to vehicles for hovering or travelling over land and/or water and which are supported above the land or water surface by at least one cushion of pressurised gas formed beneath the vehicle body. One example of such a vehicle is disclosed in my Patent No. 3,363,716.

In operation, gas-cushion vehicles are subjected to rolling and pitching forces, particularly when travelling over an irregular surface such as rough water. This is undesirable and the object of the present invention is to at least reduce the effect of such forces.

The present invention is based on the concept that stabilising moments can be exerted on a gas-cushion vehicle by providing means for laterally displacing at least part of the peripheral boundary of its supporting cushion, and thereby varying the position of the cushion centre of pressure in relation to the centre of gravity of the vehicle.

Lateral displacement of at least part of the peripheral boundary of the cushion is achieved by displacing the cushion-containing means surrounding the vertical axis through the centre of gravity of the vehicle and the cushion-containing means may comprise or include fluid curtains or structural means. Curtain fluid can be provided by air or other gas (for example, engine exhaust gas) or by a liquid such as sea water.

The vehicle-supporting cushion may or may not be divided into cushion compartments. Alternatively, or in addition, the vehicle may be supported by a primary cushion with a secondary cushion or cushions formed outside the primary cushion. As is pointed out in my Patent No. 3,412,956 (column 13, lines 18–24), the trim of a vehicle of the last-mentioned type may be varied by altering the position of the primary and/or secondary cushion or cushions relative to the bottom of the vehicle. Thus by moving the position of a cushion sideways, the centre of pressure is moved relative to the centre of gravity of the vehicle and a moment tending to vary the attitude of the vehicle is produced.

For a better understanding of the invention, and to show how the same may be put into effect, reference will now be made to the accompanying drawings, like parts having like references, in which:

FIGURE 1 is a side elevation of a gas-cushion vehicle supported by primary and secondary cushions of pressurised air, FIGURE 2 is a front elevation of the vehicle showing the vehicle tilted, the tilting being shown to an exaggerated degree for clarity, FIGURE 3 is an inverted plan view of the vehicle illustrated in FIGURES 1 and 2, FIGURE 4 is a diagrammatic partial cross-section of the vehicle illustrating one modification thereof, FIGURE 5 is a diagrammatic partial cross-section of the vehicle illustrating a further modification, and FIGURES 6a and 6b illustrate yet another modification of the vehicle, with parts in different positions.

FIGURES 1, 2 and 3 show a form of gas-cushion vehicle 1 described in my above-mentioned Patent No. 3,412,956 and supported above a ground surface 2 by a primary cushion 3 of pressurised air surrounded by a secondary cushion of pressurised air and of annular form. During normal operation of the vehicle, pressure of the secondary cushion is between that of the primary cushion and atmosphere. The vehicle body 5 incorporates a passenger and/or freight compartment 6. The compartment 6 also contains engines 7 driving air compressors 8 which supply pressurised air for forming air curtains 9, 10. The curtains 9, 10 comprise the means containing the cushions 3 and 4 respectively and surround the vertical axis 11 through the centre of gravity 12 of the vehicle. The air curtain 9 provides a cushion boundary common to both cushions 3 and 4.

In further detail, the vehicle 1 is propelled over the surface 2 by an air-screw propulsion unit 15 and controlled by twin rudders 16. As best shown in FIGURE 3, the bottom 17 of the vehicle body 5 is perforated by spaced annular ports 18, 19 connected to the compressors 8 and through which atmospheric air drawn through side intakes 20 is discharged inwardly and downwardly towards the ground surface 2 to form the air curtains 9, 10. The air curtains extend between the vehicle body 5 and the ground surface 2 and both form and maintain the primary and secondary cushions 3, 4, in the manner described more fully in my above-mentioned Patent No. 3,363,716.

Under normal operating conditions, the vehicle 1 remains substantially in the attitude shown in FIGURE 1, with the common centre of pressure of the cushions 3, 4 being disposed immediately below the centre of gravity 12.

With reference now to FIGURE 4, the ports 18, 19, are connected to the compressors 8 by a main duct 25 provided with pairs of branch ducts 26, 27. Each pair of branch ducts 26, 27 supply portions of the ports 18, 19 with pressurised air.

If the vehicle 1 tilts or rolls, as shown to an exaggerated degree in FIGURE 2, the radius of curvature of the air curtain 10 decreases at that part of the vehicle which approaches the surface. This results in a local increase in the pressure of the secondary cushion 4, which increase brings about a lateral shift (towards the downgoing side of the vehicle 1) of the cushion centre of pressure relative to the axis 11 so as to exert a righting moment which tends to stabilise the vehicle.

The operation of such a vehicle is fully described in the specifications of the above-mentioned patents and will not be described further herein.

According to the present invention, the above-described righting moment can be assisted or replaced by means whereby at least part of the cushion-containing means (i.e. the air curtains) is displaced laterally so as to vary the common centre of pressure of the vehicle-supporting cushions 3, 4.

A hinged flap 28 is mounted in the duct 25 so that the position of the flap controls the flow of pressurised air to the associated branch ducts 26, 27. It will be understood that in order to produce the moment necessary to effect the trim of the vehicle it is necessary to control the flap so that it is deflected at the correct circumferential location or locations. The flap 28 is rotated by means of a peripherally spaced series of tie-cords 29 attached to the free edge of the flap and connected, by way of pulleys 30, to winding drums 31 driven by reversible electric motors 32 under the control of the pilot. By rotating the flap 28 at the correct circumferential location or locations in an inward direction the air flowing to the port 18 at those locations can be cut off and that flowing to the associated portion of port 19 increased. Clockwise rotation of the flap 28 has the opposite effect. The effective lateral boundary of the supporting cushions 3, 4 can thus be displaced laterally from a position adjacent port 19 to a position adjacent port 18 and vice-versa at the location or locations at which the flap is rotated so that the centre of pressure of the joint cushion can be shifted correspondingly relative to the vertical axis 11.

In an arrangement as shown in FIGURE 4 in which the port 18 is annular, if a single valve flap 28 is provided to control the air flow, it is evident that it must be of flexible construction. Alternatively, the flap 28 may be formed by a series of segments of stiff material with radial joints of flexible material.

FIGURE 5 illustrates diagrammatically an alternative method of varying the relative flows of air to the ports 18, 19 using a series of sliding plates 35. Each plate 35 is slidably mounted on the floor 36 of the vehicle and is moved inwardly and outwardly over the ports 18, 19, by means of a hydraulically-operated actuator 27 under the control of the pilot of the vehicle. The plate 35 is provided with ports 38, 39 which co-operate with the ports 18, 19 respectively to define the actual positions at which curtain forming air issues from the vehicle body 5. The widths of the ports 38, 39 and their positioning relative to the ports 18, 19 is such that in a mid position of the plate 35 equal flows of air occur through the ports 38, 39 whilst in one extreme position or the other a flow of air occurs through one or other of the ports equal to the combined flow when the ports are in the said position, no flow occurring through the other port.

As only the outer edge of port 19 and the inner edge of port 18 normally takes an effective part in defining the width of the actual opening through which the curtain forming air flows, these ports are made wider than the ports 38, 39 and flow-control vanes 40, 41 are provided in the ports 18, 19.

In a modification the plates 35 are slidably mounted on the bottom surface 17 of the vehicle body but this position has the disadvantage that the plates are liable to damage. In a further modification, the relative sizes of the ports 18, 19 and ports 38, 39 can be reversed so that the ports 38, 39 are made wider and the ports 18, 19 made narrower.

FIGURES 6a and 6b illustrate a modification wherein the vehicle is wholly supported by the air cushion 3 and wherein the air curtain port 18 is moved, in a sideways direction, relative to the bottom surface 17 of the vehicle 1.

Slidably mounted above an enlarged port 18 is a series of flat plates 45 each having a relatively narrow port 46. The plates 45 are moved by a hydraulic actuator 47 under the control of the pilot of the vehicle. As shown in FIGURE 6a, a plate 45 and thus the port 46 is in its central position. By moving the plate 45 in or out in a generally radial direction the position of the port 46 and thus the air curtain 9 is varied relative to the vertical axis 11 passing through the centre of gravity 12 of the vehicle. It will be appreciated that if the position of a plate 45 is altered only on, for example, one side of the vehicle 1, this will have the effect of moving that part of the lateral boundary of the cushion 3 on that side. Thus, if a plate 45 is moved inwards towards the centre of the vehicle, as shown in FIGURE 6b, the associated portion of the lateral boundary of the cushion 3 will be moved inwards which will have the effect of moving the centre of pressure of the cushion 3 away from the centre of gravity 12 of the vehicle and towards the side remote from that in which the plate 45 has been moved. Thus the vehicle 1 will tend to drop on the side where the plate has been moved.

As the ports 18 and 19 are non-rectilinear, it will be necessary to mount the plates 25, 45, so that they slide over one another as they are moved in and out.

Whilst the vehicle described has a simple air curtain system, the various methods of stabilising and altering the trim described above can also be applied to vehicles having more complex air curtain systems. Examples of such systems (as disclosed in my copending continuation-in-part application Ser. No. 326,497 filed Nov. 27, 1963, now Patent No. 3,442,348) are those in which the air curtains are in the form of closed vortices, and those in which at least part of the air forming the curtains is recovered and reenergised, the recovered air being recirculated back to the original curtain or being used to form an additional curtain.

Where lateral displacement of the cushion-containing means is used for varying the trim of a vehicle, this provides a convenient means for maintaining the attitude of the vehicle over obstacles such as rocky ground or rough water. Taking as an example, a vehicle travelling over rough water, the trim of the vehicle can be controlled by a simple mechanism, such as a gyroscopically controlled valve, so that the vehicle remains on a substantially even keel.

With reference to FIGURES 1 and 4, the operation is as follows:

When the front of the vehicle 1 meets a large wave crest, as this tends to cause a locally reduced height and and thus a locally increased pressure rise in the vehicle-supporting cushion, the vehicle tends to lift at the front. The gyroscopic valve 60 detects this rise and through electrical signal lines 61 connected to the electric motor 32 shifts the lateral position of the cushion-containing curtain or a part thereof so that the centre of pressure of the cushion is shifted laterally, relative to the vertical axis extending through the centre of pressure of the vehicle, so as to counteract the lifting tendency caused by the wave. The valve causes the reverse effect to be created when the front end of the vehicle meets a wave trough. Such a trim control can be used to counteract undesirable movements of the vehicle at any point on its periphery. The vehicle thus operates on a substantially even keel and does not have imposed upon it undesirable vertical accelerations due to passing over obstructions.

However, when the vehicle 1 is operating over waves a number of times longer than the length of the vehicle, or over land undulations having characteristics similar to these long waves, there is not the same need to maintain the vehicle on an even keel as the vertical accelerations are quite moderate. The vehicle can thus travel at a constant height from the surface following the surface profile. In order to obtain such an operating mode when a control means responsive to attitude variation of the vehicle is used for the said curtain position variation, it will therefore be necessary to provide an override which renders the control means inoperative when, for example, the vertical accelerations or the frequency of the vertical movement is below a predetermined value. Alternatively the response of the control means responsive to attitude variations may be given a suitable time constant rather than override so that its effectiveness gradually approaches zero for very slow variations.

I claim:

1. A vehicle for hovering or travelling over land and/or water comprising means for forming a cushion of pressurised gas beneath the vehicle body for at least partly supporting the vehicle above the surface over which it is adapted to hover or travel, cushion-containing means surrounding the vertical axis through the centre of gravity of the vehicle body and said surface to form the boundary of the cushion, and stabilising means for reducing the tendency of the vehicle to roll or pitch including means for laterally displacing parts of the cushion-containing means at selected locations around the boundary of the cushion, said displacing means being operable to bodily move a part of said cushion-containing means laterally away from said axis at a location at which the vehicle is tending to tilt downwardly so as to move the position of the center of pressure of the vehicle-supporting cushion towards said location and thereby exert a stabilising moment on the vehicle.

2. A vehicle as claimed in claim 1 further comprising means for forming at least one secondary vehicle-supporting gas cushion having cushion-containing means at least part of which is common with at least part of said first-named cushion-containing means, said displacing means being operable to bodily move at least part of said common cushion-containing means relative to the vehicle axis through the center of gravity of the vehicle.

3. A vehicle as claimed in claim 1 wherein said cushion-containing means includes means for causing a fluid to issue from the lower part of the vehicle and form at least one cushion-containing curtain of moving fluid which flows towards said surface and forms at least part of the boundary of the vehicle-supporting cushion.

4. A vehicle as claimed in claim 1 wherein the cushion-containing means includes gas discharge means for discharging gas downwardly away from the vehicle so as to at least assist in forming the vehicle-supporting cushion.

5. A vehicle as claimed in claim 1 wherein the means for laterally displacing parts of the cushion-containing means is also operable to move another part of said cushion-containing means laterally towards said axis at a location at which the vehicle is tending to tilt upwardly.

6. A vehicle as claimed in claim 1 including control means responsive to variations in attitude of the vehicle and operable to control the means for laterally displacing the cushion-containing means.

7. A method of reducing the tendency to roll or pitch of a gas cushion vehicle of the type wherein a vehicle-supporting cushion of pressurised gas is contained beneath the vehicle body by means surrounding the vertical axis through the center of gravity of the vehicle comprising the step of laterally displacing a part of the cushion-containing means, at a location at which the vehicle is tending to tilt downwardly, away from said axis so as to cause a movement of the center of pressure of the vehicle-supporting cushion towards said location and thereby impart a righting moment to the vehicle.

8. A method as claimed in claim 7 comprising the further step of laterally displacing another part of the cushion-containing means, at a location at which the vehicle is tending to tilt upwardly, towards said axis.

References Cited

UNITED STATES PATENTS

| | | | |
|---|---|---|---|
| 3,181,636 | 5/1965 | Cockerell | 180—118 |
| 3,181,638 | 5/1965 | Cockerell | 180—118 |
| 3,342,280 | 9/1967 | Beardsley | 180—129 |
| 3,363,716 | 1/1968 | Cockerell | 180—122 |

A. HARRY LEVY, Primary Examiner

U.S. Cl. X.R.

180—129